United States Patent [19]

Claxton

[11] 4,236,371
[45] Dec. 2, 1980

[54] PICKING DEVICE FOR HARVESTING MACHINES

[75] Inventor: Gerald L. Claxton, Fresno, Calif.

[73] Assignee: Up-Right, Inc., Berkeley, Calif.

[21] Appl. No.: 948,093

[22] Filed: Oct. 2, 1978

[51] Int. Cl.³ .............................................. A01D 46/00
[52] U.S. Cl. ................................. 56/330; 56/DIG. 15
[58] Field of Search ................... 56/327 R, 10.9, 11.9, 56/10.2, DIG.15, 330

[56] References Cited

U.S. PATENT DOCUMENTS

| | | | |
|---|---|---|---|
| 2,828,598 | 4/1958 | Anderson et al. | 56/10.9 |
| 3,093,946 | 6/1963 | Pitt et al. | 56/DIG. 15 |
| 3,473,311 | 10/1969 | Fox | 56/330 |
| 3,827,222 | 8/1974 | Toti | 56/330 |
| 3,908,345 | 9/1975 | Oni et al. | 56/10.9 |
| 3,911,653 | 10/1975 | Burton | 56/330 |
| 3,939,629 | 2/1976 | Bruel | 56/330 |
| 4,014,160 | 3/1977 | Mecca | 56/330 |
| 4,016,711 | 4/1977 | Claxton | 56/330 |
| 4,022,001 | 5/1977 | Burton | 56/330 |
| 4,085,572 | 4/1978 | Bruel | 56/330 |

FOREIGN PATENT DOCUMENTS 2373222  7/1978  France ................................. 56/330

*Primary Examiner*—Paul J. Hirsch
*Attorney, Agent, or Firm*—Phillips, Moore, Weissenberger, Lempio & Majestic

[57] ABSTRACT

A pivotal striker rod picking device carried by a row harvesting machine, the picking device having opposed striker rod holders each pivoting about a vertical axis, one on each side of the centerline of the machine, the striker rod holders each having horizontal striker rods mounted thereon. A cyclically operable drive means is connected to each striker rod holder to oscillate each of the striker rods horizontally through a constant amount of arcuate stroke, inwardly towards and outwardly away from the machine centerline. The force of each striker rod against an object in its path of inward movement is sensed and used to shift the striker rod stroke horizontally relative to the machine centerline. A first control shifts the strokes in the same direction to maintain an equal amount of striker rod force on both sides of an object which is off-center relative to the machine. A second control shifts the stroke of a striker rod away from the machine centerline in the event the striker rod strikes the object with more than a predetermined amount of force.

36 Claims, 6 Drawing Figures

PICKING DEVICE FOR HARVESTING MACHINES

BACKGROUND OF THE INVENTION

This invention relates to picking devices for mechanical harvesters.

Harvesting machines which straddle a row of plants, such as grape vines, and move along the row to harvest the fruit thereon are now well known. Mounted on the frame and suspended therefrom are picking devices which engage the plants and remove the fruit therefrom. The picking device to which the present invention pertains is the pivotal striker type wherein a pair of opposed, vertical striker rod holders are mounted, one on each side of the machine, each striker rod holder having a plurality of vertically-spaced resilient striker rods mounted on and extending horizontally from the rod holder. Suitable drive mechanism is provided to oscillate the rod holders about their vertical axes, so that the striker rods pivot about such axes with the tips of the rods being moved back and forth, towards and away from the centerline of the machine.

Typically, the striker rods are operated in wigwag manner, with one set of rods moving towards the centerline of the machine while the other set of rods moves away from the centerline on the opposite side thereof.

The actual harvesting is accomplished with such picking mechanism as a result of the striking impact of the striker rods as they are moved inwardly and hit the sides of the plants, and/or the fruit growing thereon, first on one side of the plants and then on the other side.

Typically, the harvesting machines will move along the rows of plants at a ground speed of from 2 to 3 miles per hour, with the striker rods being operated to deliver 300–400 strikes per minute.

Often, a second set of opposed striker rods is included in the picking device, spaced longitudinally from the first set to provide a second striking action on the plants.

For maximum harvesting efficiency, the picking device should be adjusted to the particular variety of plants being harvested since different varieties of plants will require different amounts of striking force thereagainst for optimum fruit removal. If less striking force is used, less fruit removal will result. If a greater striking force is applied, the amount of fruit removal will not increase to any significant degree, but plant damage and leaf removal will increase. Leaf removal is undesirable, since such leaves must then be separated from the harvested fruit.

Typically, pivotal striker mechanisms are manually adjustable so that the stroke of the striker rods, i.e. the distance between the innermost and outermost excusion of the rods during operation, can be varied in accordance with the variety of plant being harvested. In addition, the spacing between the centerline of the machine and the innermost excusion of the striker rod tips is also manually adjustable so that such spacing can be set in accordance with the width of the plants to enable the rod tips to strike against the fruit bearing portion of the plants. Such adjustments are made prior to harvesting a particular vineyard and, once set, the adjustments remain the same during harvesting.

A common problem in a harvesting operation is that the machine and striker rods thereon will not remain centered on the fruit bearing portions of the plants as the machine moves down a plant row. Oftentimes this is caused by careless steering of the machine by the operator. In other instances the plants will be supported by posts and be planted in an area where there is a sufficient prevailing wind such that the posts will all be inclined from vertical. The operator may steer the machine down a row, centering the machine on the tops of the posts which are visible above the plant foliage, but with the result that the fruit bearing portion of the plants are actually off-set from the tops of the inclined post. Another problem is centering a machine on a row of plants is that when the row has an east-west orientation, the foliage will be heavier on the south, or sunny, side of the plants so that the center of foliage is off-set from the fruit-bearing zone of the plants.

Regardless of the reason why a machine may be offset from the fruit bearing zone, when this occurs one side of the fruit bearing portion of the plants will be struck with more force than the other. Excessive plant damage and leaf removal will occur on one side of the plants, while reduced fruit removal will occur on the other.

As a consequence, there is a need for a pivotal striker rod picking device which will automatically center the striking action of the rods on the fruit-bearing portions of the plants, with equal striking force being applied to each side of the plants, even though the centerline of the fruit-bearing portions are offset from the center line of the machine.

Another problem in harvesting is that oftentimes the width of the plants will vary along a row. For example, many vineyards have relatively large vine trunks spaced along a row with the fruit-bearing canes trained along wires extending between the trunks. If the striker rods are set to strike against the relatively narrow fruit-bearing zone along the wires, then the rods will strike with an undesirably great force against the relatively large trunks as the machine moves throughout, such that excessive plant damage and striker rod breakage will occur. If, however, the machine is set to accommodate the width of the trunk, inefficient harvesting of the fruit-bearing canes between the trunks will result.

As a consequence, there is a need for a striker rod picking device which will automatically vary the tip spacing between opposed striker rods in accordance with variations in plant width so that a uniform maximum striking force will be applied to the plants along the length of a row.

Another inadequacy of present pivotal striker rod picking devices is that single-pair and twin-pair devices are separate devices, separately manufactured and installed. This has resulted in a lack of flexibility in the manufacture and use of harvesting machines equipped with pivotal striker picking devices.

There is a need for a single unit striker rod picking device that can be easily changed from use with one pair of opposed striker rods to two pairs thereof, and vice-versa. There is also a need for a striker rod picking device equipped with two pairs of opposed striker rods wherein the wig-wag movement of the two pairs of striker rods can be easily changed from an in-phase relation to an out-of-phase relation, and vice-versa.

SUMMARY OF THE INVENTION

The present invention is directed towards fulfilling one or more of the above needs.

One aspect of the invention is that opposed striker rods are continuously oscillated about vertical axes on each side of the centerline of the machine with a constant force of oscillation and through a constant arcuate stroke of the striker rods and tips thereof towards and away from the centerline. The amount of striking force of the striker rods against the plants in their paths of movement is sensed and the strokes of the striker rods are shifted relative to the machine centerline in accordance with such forces, with the constant stroke and force of oscillation being maintained.

A further aspect of the invention is that the amount of striking force against both sides of a plant is sensed, and if the striking force on one side of the plant is greater than the other, the strokes of the opposed striker rod are shifted relative to the centerline, with the stroke of one striker rod being shifted away from the machine centerline while the stroke of the other striker rod is shifted towards such centerline so that the striker rods center themselves relative to the plants, to strike with equal force against both sides thereof.

Yet another aspect of the invention is that the amount of striking force of either striker rod against the plant or other object in its path of movement is sensed, and the stroke of a striker rod is shifted away from the machine centerline when the force of that striker rod exceeds a predetermined fixed amount of force. In this aspect of the invention, one or both sides of the plant can be protected against excessive striking force if the machine is off-center relative to the plant being harvested or if the width of the plant varies along the row being harvested.

A further aspect of the invention is to provide a cyclically operable drive means for oscillating a striker rod about a fixed vertical axis and through a constant stroke, a means mounting the drive means for movement relative to the machine to shift the stroke of the striker rod relative to the centerline of the machine, and a control means responsive to the force exerted by the striker rod on an object in its path of arcuate movement for moving the mounting means and drive means to cause such shift in order to limit the amount of striking force to a predetermined maximum amount or to center the striker rod on a plant so that both sides are struck with equal force.

A still further aspect of the invention is to provide a striker rod unit having two vertical striker rod holders, an oscillating drive crank with connecting links to the striker rod holders for oscillation thereof and wherein the phase relative to the two striker rod holders relative to each other can be easily changed by a simple repositioning of one of the connecting links.

Other aspects of the invention will become apparent in the course of the following detailed description.

BRIEF DESCRIPTION OF THE DRAWINGS

In the drawings, forming a part of this application, and in which like parts are designated by like reference numerals throughout the same.

DESCRIPTION OF THE PREFERRED EMBODIMENTS

Figure 1:
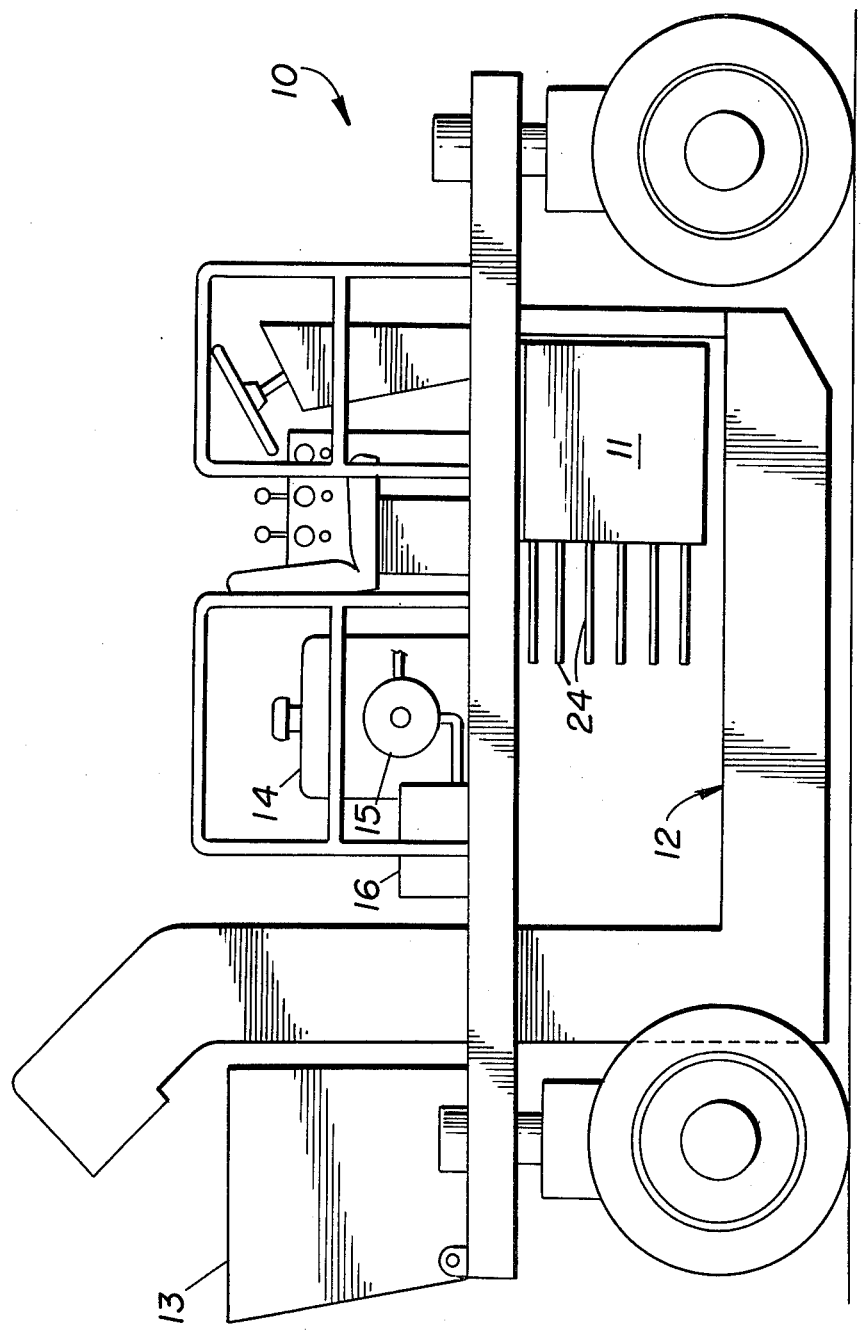
FIG. 1 is a side elevational view of a vine harvesting machine equipped with a fruit picking device in accordance with the present invention.

Referring now to the drawings, wherein are disclosed preferred embodiments of the drawings, FIG. 1 illustrates a vine harvesting machine 10 adapted to straddle and move along a row of vines, such machine having a fruit picking device 11 mounted on the frame thereof. The fruit dislodged from the vines will be caught and moved by conveyor mechanisms 12, one on each side of the machine, to a suitable collection point, as, for example, hopper 13 on the machine. Engine 14 provides power for the machine and drives pump 15 to supply oil under pressure from reservoir 16 to the various hydraulic circuits of the machine.

Figure 2:
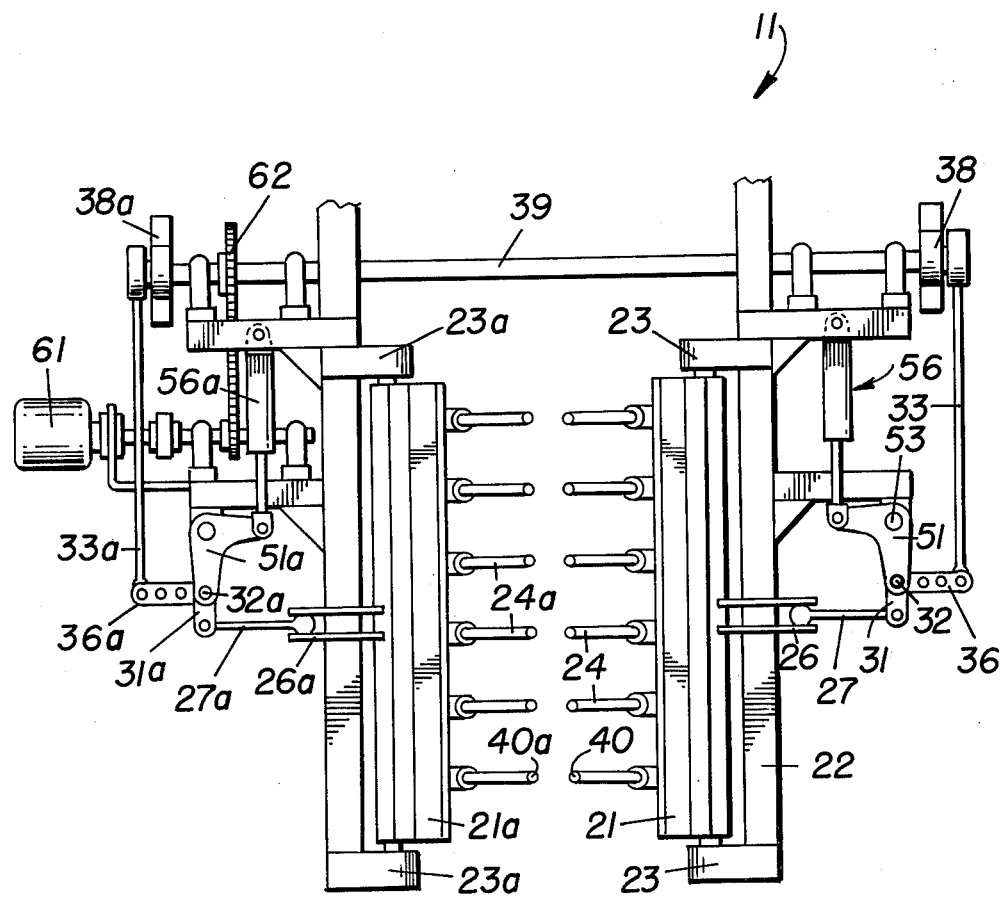
FIG. 2 is a rear elevational view of the fruit picking device.
Figure 3:
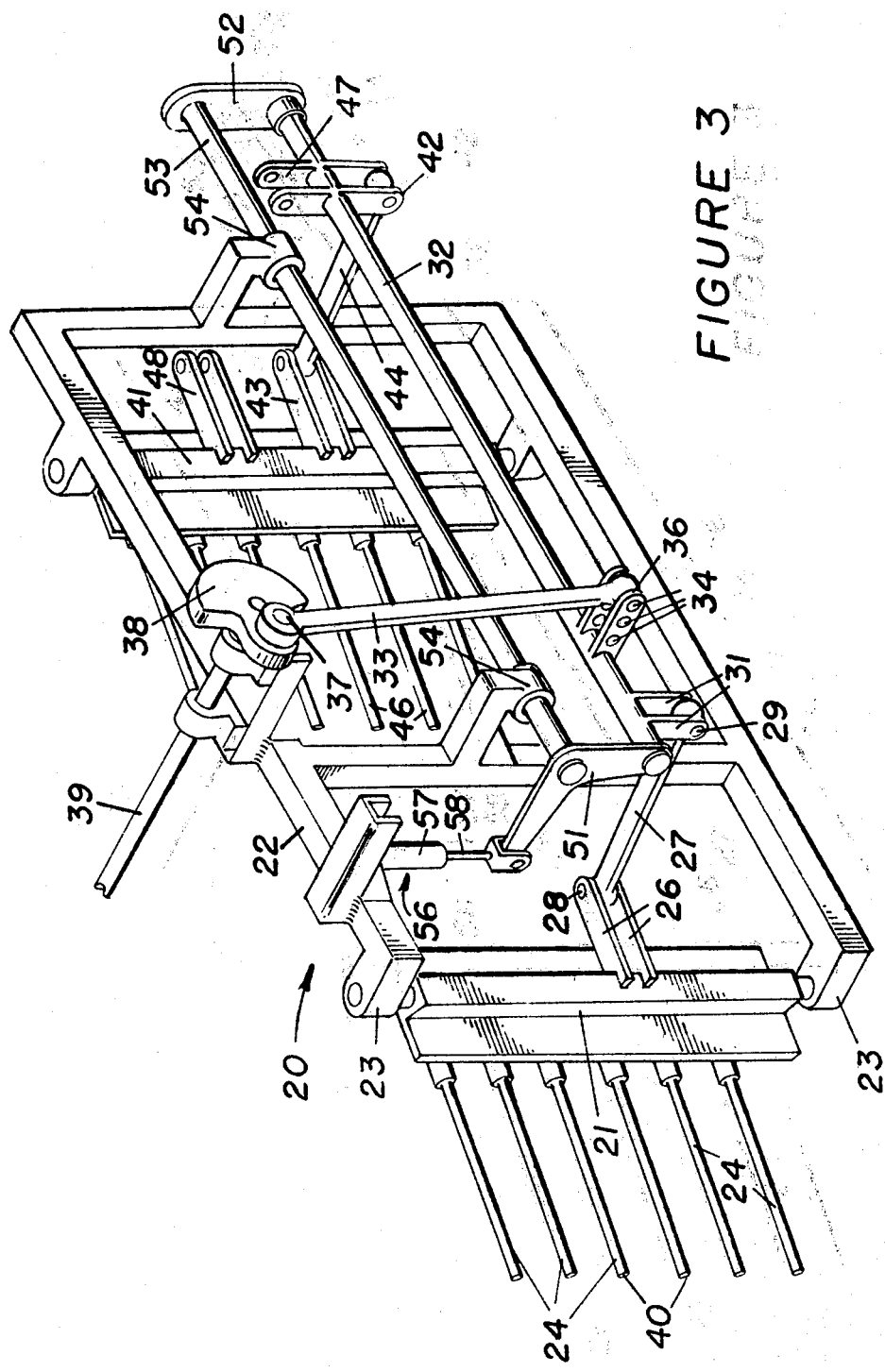
FIG. 3 is a perspective view of one side of the fruit picking device of FIG. 2.

The details of the picking device 11 are shown in FIGS. 2 and 3. As is seen from the drawings, the picking device comprises opposed picking heads 20 and 20a, one on each side of the vertical centerline of the machine. Since the picking heads are mirror images of each other, only picking head 20 will be described in detail. Corresponding parts of picking head 20a will be identified by like reference numerals, with the letter "a" appended thereto.

Picking head 20 includes a vertically disposed striker rod holder 21 pivotally mounted at its upper and lower ends to sub-frame 22 for pivotal movement of the holder 21 about a vertical axis. Preferably, the striker rod holder 21 is pivotally mounted to the sub-frame by means of torsion bearings 23. A suitable number of vertically-spaced, elongated striker rods 24 are secured to rod holder 21 and extend therefrom horizontally and rearwardly of the machine.

Horizontally extending arms 26 on holder 21 have one end of drive link 27 pivotally connected thereto at 28, the other end of drive link 27 being pivotally connected at 29 to carnk arms 31 which extend downwardly from drive shaft 32. In turn, connecting rod 33 is pivotally connected at its lower end to one of the holes 34 of crank arms 36 which extend outwardly from shaft 32, and is connected at its upper end to pin 37 of eccentric 38, pin 37 being offset from the axis of cross-shaft 39 on which eccentric 38 is mounted.

As is apparent, drive shaft 32 and its crank arms 29 and 36, together with drive link 27, comprise a cyclically operable drive means connected to rod holder 21 for oscillating the rod holder through a predetermined degree of arcuate movement during each cycle of operation of the drive means, such drive means being cyclically operated by the vertical reciprocation of connecting rod 33 in response to each full revolution of cross-shaft 39. The degree of arcuate movement of the striker rod holder 21, and the consequent stroke of the striker rods and tips 40 thereof, i.e. the amount of the movement of the rods and tips transversely to the longitudinal centerline of the machine during a cycle of operation of the drive means, can be adjusted by changing the connection of connecting rod 33 from one set of holes 34 of crank arms 36 to another set of holes thereof.

In like manner, and as seen in FIG. 3, oscillatory movement of drive shaft 32 will produce an oscillatory movement of the second rod holder 41 about the vertical axis thereof by means of the crank arms 42 fixed to drive shaft 32, arms 43 extending from rod holder 41 and drive link 44 extending between and pivotally connected to arms 42 and 43. Since crank arms 42 and 31 extend radially from drive shaft 32 in the same direction therefrom, the striker rods 46 mounted on the second rod holder 41 will oscillate in unison with the striker rods 24 mounted on the first rod holder 21. The stroke of strike rods 46 will also be equal to the stroke of striker rods 24.

Drive shaft 32 also has crank arms 47 fixed thereto and extending therefrom at a 180° offset from crank arms 42. If it is desired to have striker rods 24 operate in out-of-phase relation with striker rods 46, such operation is achieved by simply connecting the drive link 44 between cranks arms 47 and arms 48 on the striker rod holder 21.

Drive shaft 32 is pivotally journaled at one end thereof in the depending arm of bell crank 51 and pivotally journaled at its other end in depending arm 52, bell crank 51 and depending arm 52 both being fixed to support shaft 53 which is parallel to drive shaft 32. Journals 54 fixed to sub-frame 22 fix the longitudinal axis of support shaft 53 relative to the sub-frame while allowing rotative movement of the support shaft about its axis. Bell crank 51, support shaft 53, and depending arm 52 thus constitute a means mounting the drive shaft 32 for translatory movement thereof relative to sub-frame. A hydraulically-actuated control cylinder 56, comprising a cylinder housing 57 and piston rod 58, is connected between sub-frame 22 and the horizontal arm of bell crank 51. As is apparent, extension of the control cylinder 56 will move crank 51 and depending arm 52 in a counterclockwise direction relative to the fixed axis of support shaft 53, to move drive shaft 32 and its longitudinal axis outwardly from the centerline of the machine. In turn, this will shift the stroke of striker rods 24 towards the centerline of the machine.

Likewise, retraction of control cylinder 56 will move bell crank 51 so that the axis of drive shaft 32 is translated toward the machine centerline, causing the stroke of the striker rods 24 to shift outwardly from the machine centerline.

Since the amount of the stroke is fixed by the amount of vertical reciprocation of connecting rod 33 and its particular connection to crank arm 36, the amount of the stroke of the striker rods will remain constant, whether such stroke has been shifted towards or away from the machine centerline in response to extension or contraction of control cylinder 56. Likewise, the force of oscillation of striker rods 24 and 46 will remain constant, whether the strokes of these rods have been shifted towards or away from the machine centerline, because the extension or contraction of the control cylinder 56 does not vary the power delivered by the vertically reciprocating connecting rod 33 to the rod holders 21 and 41 through crank arm 34, crank shaft 32, crank arms 31 and 42, rigid drive links 27 and 44 and fixed arms 26 and 43 on rod holders 21 and 41.

As mentioned previously, picking head 20a is a mirror image of the above-described picking head 20 and includes all of the components of picking head 20 described above. In addition, picking head 20a has hydraulic motor 61 mounted thereon, the drive of motor 61 being coupled to cross-shaft 39 by chain 62 so that the single motor will cause operation of both of the picking heads. Eccentrics 38 and 38a are fixed to cross-shaft 39 so that as cross-shaft 39 rotates, connecting rod 33 will move downwardly while connecting rod 33a is moving upwardly, and vice versa. Such movement will cause the opposed striker rods 24 and 24a (and also opposed rods 46 and 46a) to move in wig-wag fashion, with the tips of rods 24 and 24a moving in unison to the right, relative to the centerline of the machine, and then moving in unison to the left during each full revolution of cross-shaft 39.

OPERATION

Figure 4:
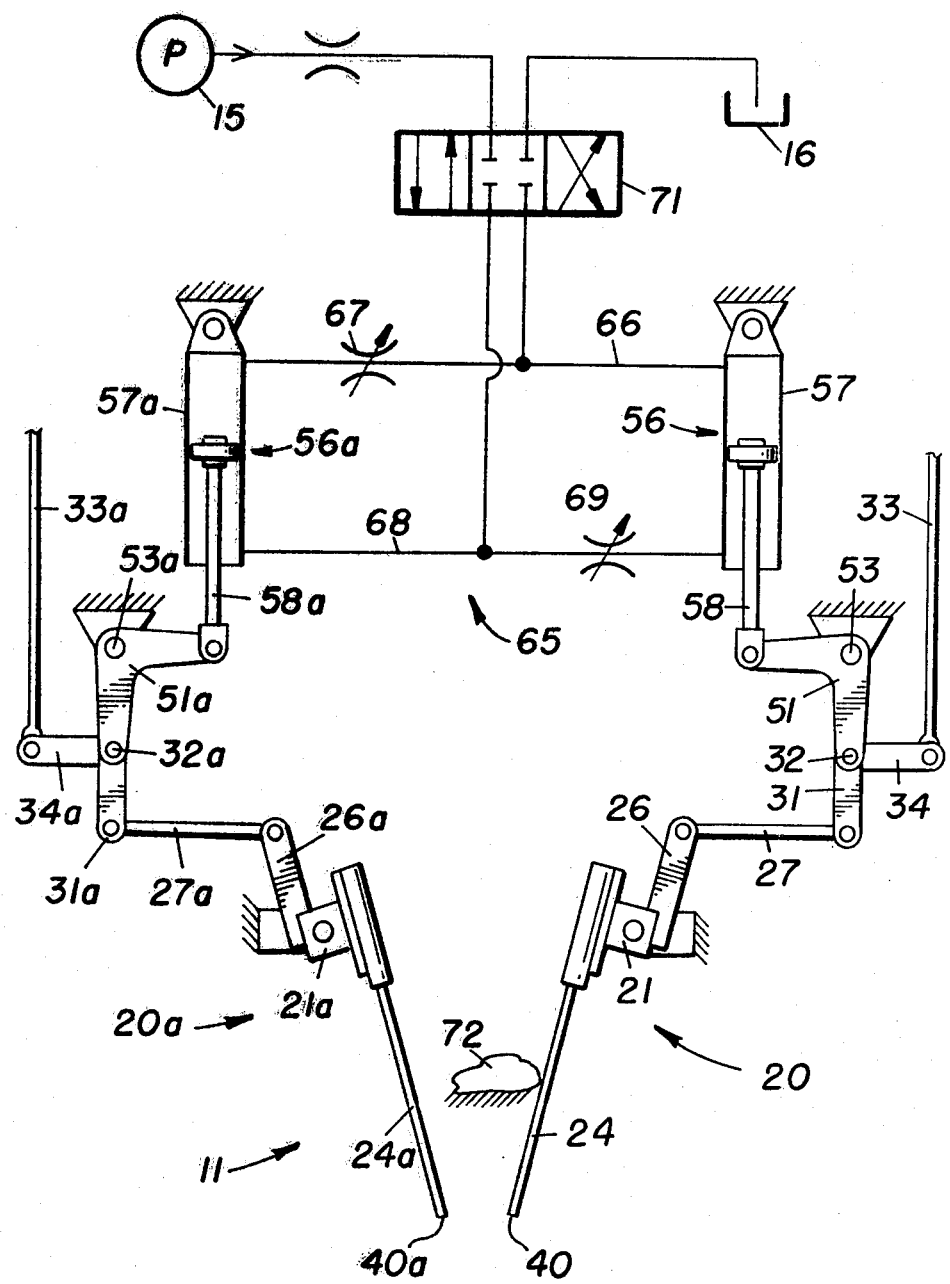
FIG. 4 is a simplified view of the major components of the fruit picking device, with a hydraulic control circuit for providing automatic centering of the picking device relative to the row of vines being harvested.
Figure 5:
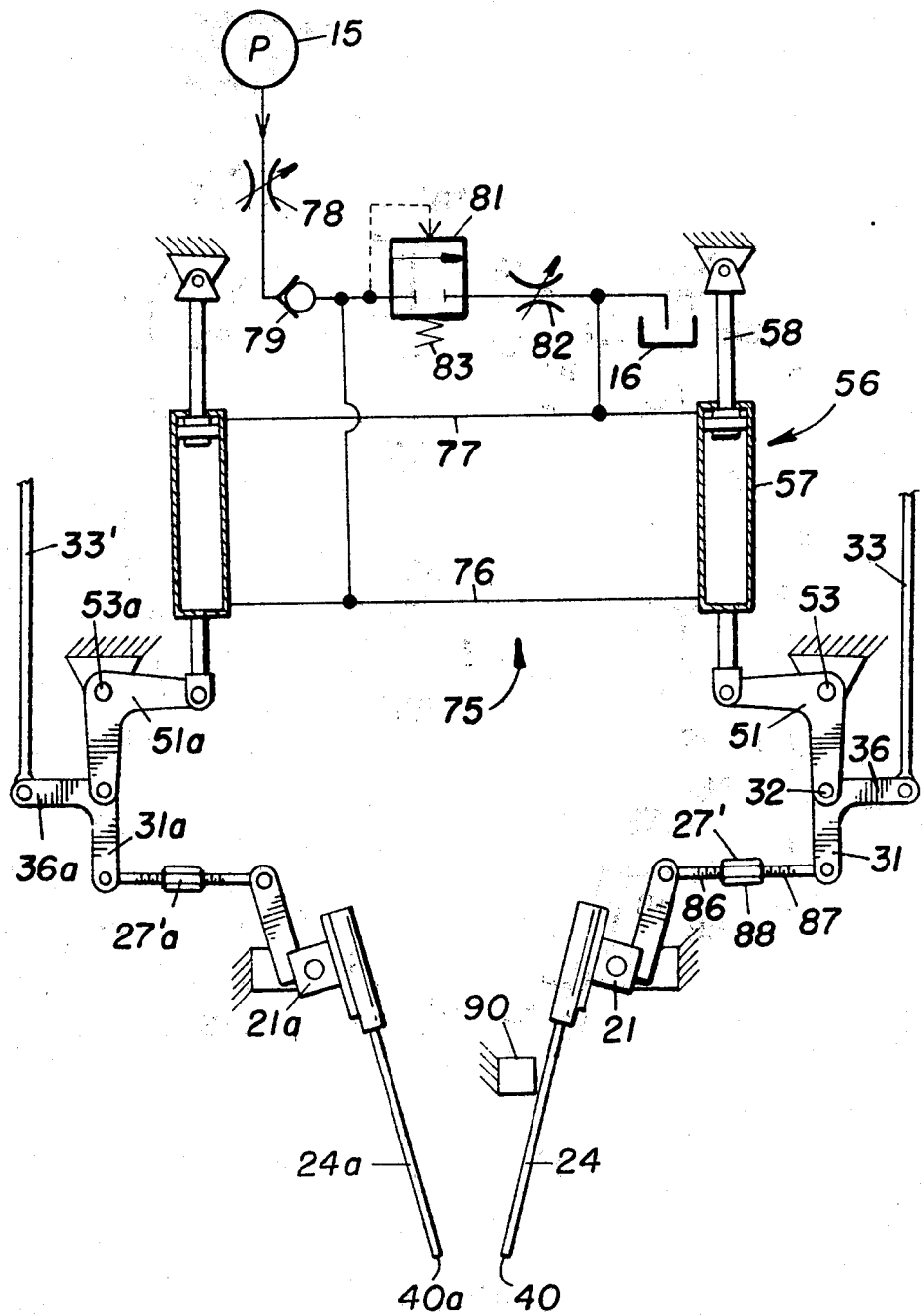
FIG. 5 is similar to FIG. 4, with a hydraulic control circuit for limiting the force exerted by the picking device on the row of vines being harvested.
Figure 6:
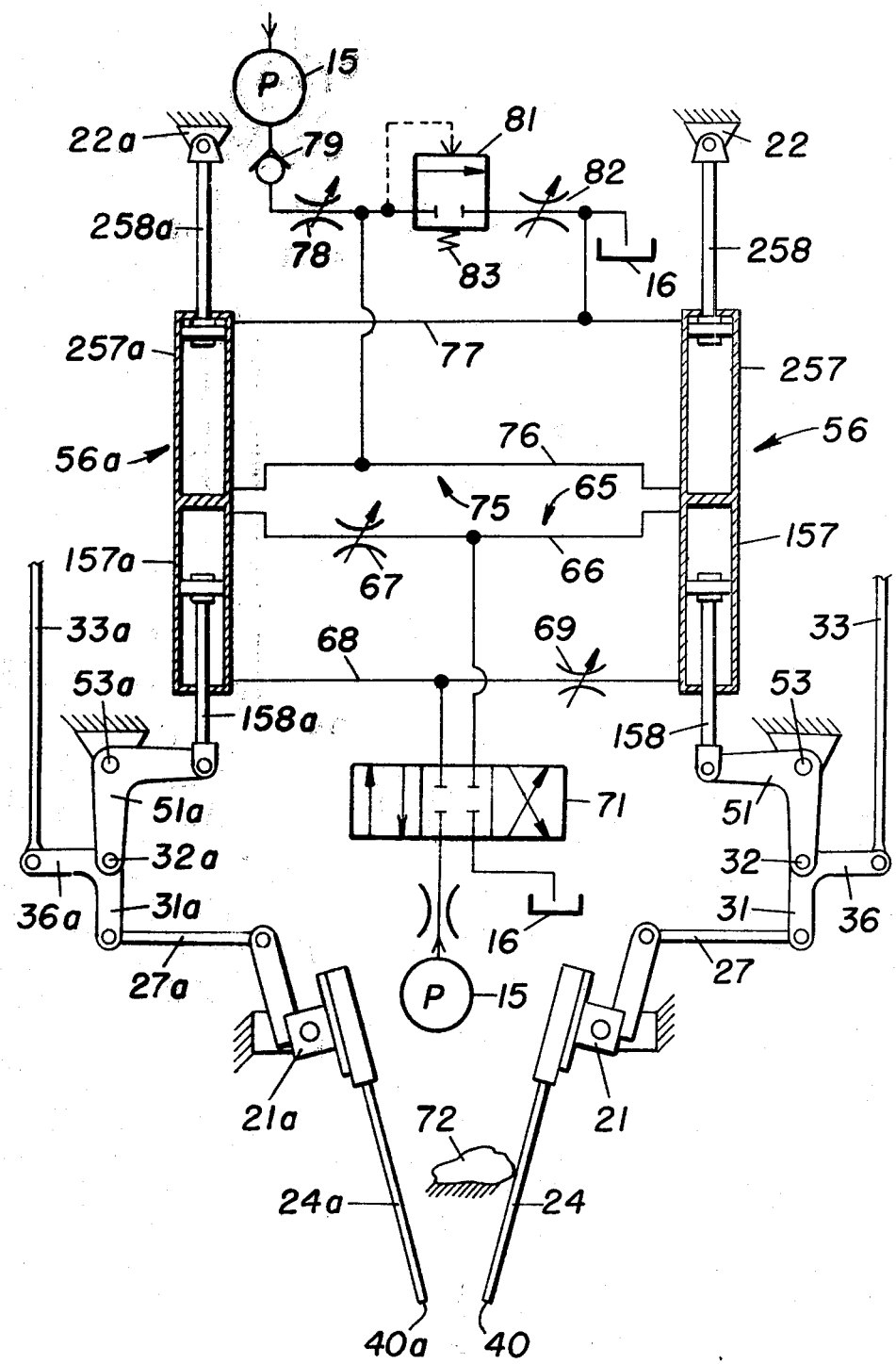
FIG. 6 is similar to FIG. 4, with a hydraulic control circuit for centering the picking device on the row of vines and also for limiting the exerted by the picking device on the vines.

The operation of the picking device 11 will now be described in connection with the different hydraulic control systems for the control cylinders 56 and 56a that are shown in FIGS. 4, 5 and 6. These figures are schematic in nature, with the rod holders 21 and 21a, rods 24 and 24a and arms 26 and 26a being shown in plan, while the other illustrated elements are shown in elevation. Also, for purposes of simplicity, the second rod holders 41 and 41a and their striker rods 46 and 46a are not shown in these figures.

In FIG. 4, a hydraulic control system 65 is shown which will provide for automatic centering of the striker rods relative to the plants being harvested.

In this control circuit, the upper, or head, ends of the control cylinders 56 and 56a are interconnected by line 66, with an adjustable restriction 67, such as a needle valve being provided to restrict the rate of flow through line 66. Similarly, line 68 and adjustable restriction 69 interconnect the lower, or rod, ends of the control cylinders. Lines 66 and 68 are connected to three way valve 71 which can be operated by the vehicle operator to connect one of lines 66 or 68 to pump 15 while connecting the other line to hydraulic reservoir 16, or to block lines 66 and 68 from either the pump or reservoir.

Valve 71 is first used by the vehicle operator to adjust the spacing between the tips 40 and 40a of striker rods 24 and 24a to the vines of the particular area being harvested. For example, if the operator wishes to increase the tip spacing, he will move valve 71 to the right, so that pump pressure is applied to the rod ends of the control cylinders by line 68. Piston rod 58 will move upwardly, rotating bell crank 51 in a clockwise direction about the fixed axis of shaft 53. With connecting rod 33 motionless, shaft 32 and bracket 31 will be moved to the left so that rod holder 21 will be rotated in a counter-clockwise direction to move the tip of striker rod 24 to the right, away from the centerline of the machine. Similarly, upward movement of piston rod 58a will cause the tip of rod 24a to move to the left, away from the centerline of the machine. When the rod tips have been spread to the desired amount, the operator will move valve 71 to its illustrated, center, position. Similarly, the operator can cause the rod tips to be moved together by shifting valve 71 to the left, the valve 71 again being returned to center position when the tips have been spread to a desired spacing therebetween. With valve 71 centered, the control cylinders 57 and 57a and their interconnecting lines 66 and 68 comprise a closed circuit so that a movement of one of the piston rods will provide an equal and opposite amount of movement of the other piston rod, causing the striker rod tip spacing to remain constant.

With the rod tip spacing adjusted, hydraulic motor 61 is started to put the picking device into operation and the machine is moved down the row of plants. FIG. 4 illustrates one of the plants 72 in the row, such plant being off-center with relation to the centerline of the machine. As the machine moves forwardly on the ground, the striker rods will move upwardly in FIG. 4, and upward movement of connecting rod 33 will cause rod 24 to pivot in a clockwise direction and strike against the plant 72. The reactive force of the plant against the striker rod will impose a horizontal force on shaft 32, urging it to the left, causing bell crank 51 to urge piston rod 58 upwardly. This in turn increases the pressure in the head end of cylinder 57 causing a limited amount of fluid to flow through line 66 and restriction 67 to the head end of cylinder 57a. Such flow allows piston rod 58 to move upwardly while forcing rod 58a to move downwardly, with a net result that crank 51 pivots in a clockwise direction to move shaft 32 toards the centerline of the machine while crank 51a is also rotated in a clockwise direction to move shaft 32a away from the centerline of the machine. As a consequence, the stroke of striker rod 24 will be shifted away from the centerline of the machine, while the stroke of striker rod 24a will be shifted towards the centerline, and by a like amount.

As connecting rod 33 then moves downwardly in a cycle of opeartion, striker rod 24 will move in a clockwise direction, away from plant 72. The removal of the reactive horizontal force from shaft 32 will not cause piston rod 58 to move back downwardly.

As the machine continues to operate, striker rod 24 will repeatedly strike against plant 72 on each inward movement of the striker rod, with the point of impact on the rod being progressively further from the striker rod holder, due to the forward ground movement of the machine. The reactive force of the plant against the striker rod 24 on each inward strike will progressively move piston 78 upwardly so that the stroke of a striker rod 24 will progressively be shifted away from the centerline. Because of the slave action of the control system, the stroke of striker rod 24a will be progressively shifted towards the centerline.

As the inwardmost excursion of the tip of striker rod 24a gradually moves to the right, striker rod 24a will strike against plant 72 with progressively increasing force. When striker rod 24a strikes against the plant, the horizontal reactive force on drive shaft 32a will impose an upward force on piston 58a to force fluid from the head end of control cylinder 56a back through restriction 67 and line 66 to control cylinder 56. At such time, striker rod 24 is pivoting away from the plant so that no reactive force is imposed on shaft 32 so that piston 58a can force fluid from the head end of control cylinder 56a to the head end of control cylinder 56.

In a single cycle of operation, striker rod 24 will strike first against plant 72 while rod 24a is moving away therefrom, and the striking force of rod 24 will cause a finite amount of fluid to flow through line 66 to the left and line 68 to the right, the amount of flow being dependent upon the force with which the plant is struck and by the setting of restrictions 67 and 69 in the flow lines. In the other half of the cycle of operation, striker rod 24a will strike the plant while striker rod 24 is moving away therefrom, and the striking force of rod 24a on the plant will cause a finite amount of fluid to flow through lines 66 and 68 in the opposite direction, the amount of flow again being dependent upon the force of striker rod 24a on plant 72.

If in a single cycle of operation striker rod 24 strikes with greater force against plant 72 than does striker rod 24a, piston rods 58 and 58a will be moved upwardly and downwardly, respectively, by a finite amount because of the force of striker rod 24 on the plant and will then be moved downwardly and upwardly, respectively, by a finite but lesser amount because of the lesser force of striker rod 24a on the plant. The net result for such a single cycle of operation is that the strokes of striker rods 24 and 24a will have both shifted to the right by an amount dependent upon the difference in striking force by striker rods 24 and 24a.

The strokes of both striker rods 24 and 24a will continue to shift towards the right, and by like amounts, until the striker rods are centered on the plant with each side of the plant being struck with equal force. At such time the system will stabilize. If the off-center relation of the plants to the machine again changes, so that the plants are further off-center or less off-center, the imbalance of the forces imposed by the striker rods 24 and 24a on the plant will again cause the control system 65 to move the drive shafts 32 and 32a in the appropriate direction so that the strokes of the striker rods will again shift in unison so that the striker rods will be centered relative to the plants and so that the plants will be struck with equal force on both sides thereof.

Thus, with the control system of FIG. 4, the striker rod operation will be automatically centered on the plants for equal force strikes against each side of the plants and with the tip spacing remaining constant. The magnitude of the striking forces can vary, depending upon the tip spacing chosen by the operator and the width of the plants being harvested, but will be equal on both sides of the plants.

In FIG. 5 a hydraulic control system 75 is shown which will limit the force imposed on the plants to a predetermined maximum amount.

In this system, control cylinder 56 is shown with the cylinder housing 57 thereof being connected to crank 51 while the piston rod 58 is fixedly connected to the subframe, although such connections could be reversed if desired. Control cylinder 56a is similarly connected. Again, the head and rod ends of cylinders 56 and 56a are interconnected by lines 76 and 77 respectively, with line 77 being open to reservoir 16. Presure from pump 15 is continuously available through restriction 78 and check valve 79 to line 76, and fluid from line 76 can be relieved through relief valve 81 and restriction 82 when the pressure in line 76 is above the value, set by adjustable spring 83, required to move valve 81 to open position.

In operation, fluid from pump 15 is first applied through line 76 to the head end of cylinders 56 and 56a so that the cylinders extend fully, to the position shown in FIG. 5.

Such extension of the control cylinders will position cranks 51 and 51a so that drive shafts 32 and 32a are spaced their maximum distance from the centerline of the machine. Vertical reciprocation of connecting rods 33 and 33a will cause oscillatory movement of the striker rods 24 and 24a, with their tips 40, 40a moving through a constant stroke inwardly towards and outwardly from the centerline of the machine. The tip spacing can be set in this embodiment by an adjustable length drive link 27', which has left and right hand threaded members 86 and 87 connected together by sleeve 88.

Suppose now the machine is progessing along the row so that striker rod holder 21 (moving upwardly in FIG. 5) and striker rods 24 approach a fixed post 90. As rods 24 move along the row and oscillate back and forth, the rods will begin to strike against the post, with the point of impact being further and further from the pivot point of the striker rod holder 21. The force of the striker rod against the post will increase on each succeeding impact, and the horizontal reactive force to the left on shaft 32 will likewise increase on each successive impact.

The reactive force to the left on shaft 32 will, by means of the bias crank 51, be applied upwardly to cylinder housing 57 to increase the pressure therewithin. As long as the increased pressure therein is less than that needed to open relief valve 81, nothing happens. If the reactive force of post 90 on striker rod 24 increases so that the pressure in control cylinder 76 increases sufficiently to overcome the bias of spring 83, relief valve 81 will open, allowing some of the fluid in cylinder 57 to discharge to the reservoir 16. Such discharge will allow cylinder housing 57 to move upwardly, pivoting crank 51 clockwise to move drive shaft 32 to the left. When connecting rod 33 then moves downwardly to pivot the striker rod 24 away from post 90, the horizontal reactive force on shaft 32 will disappear, so that fluid from pump 15 can again flow into the head end of cylinder housing 57. The restrictions 79 and 82 are, however, set so that more fluid will be discharged from cylinder housing 57 in response to an overpressure condition during a cycle of operation than will be forced back into the cylinder housing during the remainder of the cycle. Accordingly, as the rod 24 continues to impact on post 90, the cylinder housing 57 will gradually move upwardly, and drive shaft 32 will gradually move to the left to shift the stroke of the striker rods 24 away from the centerline of the machine. Such shift will continue until an equilibrium condition is reached, wherein the striker rod 24 impacts against post 24 with no more than the predetermined force necessary to open valve 81.

When the machine progresses forwardly sufficiently such that striker rod 24 is moved past post 90, cylinder housing 57 will refill and move downwardly to the position shown in FIG. 5.

During the above described operation, the pressure in cylinder 56a will likewise vary, from pump pressure up to the pressure setting of the relief valve 81 because of the interconnecting line 76. However, if the force of rod 24a on the vine or post is insufficient to cause upward movement on cylinder housing 57a, cylinder 56a will remain fully extended and the relation of the stroke of striker rod 24a to the centerline of the machine will be unchanged.

If striker rod 24a had instead impacted on post 90 with a force greater than that required to open relief valve 81, then crank 51a would have moved shaft 32a to the right to shift the stroke of striker rod 24a away from the machine centerline to reduce the impact force of striker rod 24a on the post while crank 51 would remain unchanged.

If the vine width increases, or the machine passes a large firm trunk, so that both striker rods 24 and 24a strike against the plant with greater force than that required to open relief valve 81, then both cylinder housings 57 and 57a will move upwardly so that drive shafts 32 and 32a are both moved towards the centerline of the machine.

The net result of the system of FIG. 5 is that the distance from the centerline of the machine to the striker rod tip at its inwardmost excusion is automatically adjusted, for each tip, so that the force of the opposed striker rods against the plants, or other obstances, does not exceed the desired value.

The systems of FIGS. 4 and 5 are similar in that in each system the forces exerted by the striker rods on objects in their path of movement are sensed and the stroke of striker rod 24 is shifted away from the centerline of the machine when the force of that striker rod exceeds a desired reference level. In the system of FIG. 4, the desired reference level is the amount of force exerted by striker rod 24a on the object. In the system of FIG. 5, the desired reference level is the predetermined fixed amount of striking force established by the setting of relief valve 81. The systems differ in that in FIG. 4, the strokes of the opposed striker rods 24 and 24a are shifted in unison with each other to provide compensation for off-center driving, with the tip spacing remaining constant. In the system of FIG. 5, the strokes of one, or both of the striker rods are shifted such that the tip spacing will change, enabling the striker rod operation to accommodate itself to variations in width of the plants along the row.

The system of FIG. 5 will, however, provide some accommodation to off-center driving so that the plants are not subjected to excessive damage. For example, if the center of the plants are to the right of the centerline of the machine, the force of striker rods 24 on the plants will increase, but crank 51 will move drive shaft 32 so that the force will not increase beyond the desired limit. However, the force of the opposed striker rods 24a on the plants will decrease, because of the off-center relationship, and the harvesting efficiency on that side of the plant will be decreased somewhat.

The system of FIG. 6 combines the functions of the hydraulic control circuit 65 of FIG. 4 and 75 of FIG. 5, to provide a system which will automatically center the striker rods relative to the row of plants being harvested so that the striking force is equal on each side of the row and which will also cause the striker rod tips to be spread apart to limit the striking force to a predetermined maximum amount.

The control cylinder 56 differs from that previously described in that the cylinder comprises two joined together cylinder housings 157 and 257, with piston rod 158 extending from housing 157 and connected to bell crank 51 and with piston rod 258 extending from housing 257 and connected to sub-frame 22. Control cylinder 56a is the same.

In operation, pump 15 is started and hydraulic fluid flows through check valve 78, restriction 79 and line 76 to the head ends of cylinder housings 257 and 257a so that the piston rods 258 and 258a extend fully therefrom. The operator can then adjust the spacing between the tips of the striker rods 24 and 24a by means of valve 71, as described in connection with FIG. 4.

The machine then starts down the row of plants to be harvested. If the forces exerted by the striker rods 24 and 24a on the plants or posts never exceed the force required to cause relief valve 81 to open, piston rods 258 and 258a will remain fully extended so that cylinder housings 157 and 157a will remain stationary with respect to sub-frame 22 and 22a. As a consequence, if the center of plant 72 is off-center relative to the centerline of the machine, the imbalance in striking force of striker rods 24 and 24a on the opposite sides of the plant will cause the control system 65 to move drive shafts 32 and 32a in unison to the left, in a manner as described above in connection with FIG. 4, so that the striker rods 24 and 24a will impact against the plant with equal force.

Suppose now the width of the plant should increase so that the striking force of the striker rods centered thereon likewise increases, and suppose that the striking force increases beyond the desired upper limit. As striker rod 24 strikes against the plant, the reactive force will urge piston rod 158 upwardly in cylinder housing 157 to increase the pressure in the head end thereof. Since restriction 67 limits the rate of flow from the head end of cylinder housing 157, the increased pressure therein will urge cylinder housings 157 and 257 upwardly to increase the pressure of the fluid in cylinder housing 257. If this pressure is high enough to open relief valve 81, fluid will be discharged from the head end of cylinder housing 257 so that such housing will move upwardly relative to piston rod 258. As cylinder housing 257 moves upwardly, cylinder housing 157 and piston rod 158 will move therewith so that crank 51 will move drive shaft 32 to the left. In like manner, when striker rod 24a strikes against the other side of the plant with more than the desired amount of force, cylinder housing 257a will move upwardly, causing crank 51a to move shaft 32a to the right. Thus, the control system 75 will cause the tip spacing of the striker rods to increase so that only the desired maximum striking force is exerted in the plants, in the same manner as described in connection with FIG. 5.

If while operating on wider plants, such that the control system 75 has caused the tip spacing to be increased, the machine should be driven in off-center relation to the plants, the control system 65 will simultaneously move shafts 32 and 32a and shift the strokes of striker rods 24 and 24a in the same direction so that the widened striker rod tips will center themselves on the plant.

As a result, with the combined control system 65 and 75 of FIG. 6, the plants will be struck with equal force on both sides thereof even if the machine is off-center relative to the plants and such force will not exceed the maximum desired force.

By virtue of the limitation of force exerted by the striker rods in the plants and/or the automatic centering of the striker rod strokes relative to the vine, the present invention enables an operator to drive into a vineyard and start harvesting without time consuming adjustments, which, if not done properly, will result in less efficient fruit removal and increased leaf fragmentation and vine damage. In addition, the present invention enables a harvesting machine to harvest faster at a reduced rate of striker rod oscillation. This, of course, decreases both the forces on the mechanism for a given acreage. In turn the longevity of the picking device components is correspondingly increased, resulting in decreased downtime for repairs and decreased maintenance costs.

What is claimed is:

1. The method of operating the striker rods of a harvesting machine, the machine being adapted to straddle and move along a row of plants and having first and second opposed and elongated striker rods mounted on the machine and being pivotal about vertical axes so that the rods and tips thereof can be moved inwardly towards and outwardly from the centerline of the machine, the method comprising:
    continuously oscillating each of the striker rods about its vertical axes with a constant force of oscillation and through a constant arcuate stroke inwardly and outwardly from the centerline of the machine as the machine moves along the row of plants,
    sensing the amount of force exerted by each of the striker rods against the plants as the striker rods move inwardly towards the centerline of the machine and strike the plants,
    shifting the stroke of the first striker rod tip away from the centerline of the machine while maintaining the constant force of ocillation and the constant stroke thereof when the force exerted by the first striker rod on the plants exceeds a desired reference level, and continuing to shift such stroke away from the centerline of the machine until the force exerted by the first striker rod on the plant no longer exceeds such reference level.

2. The method of claim 1 and further including:
    shifting the stroke of the first striker rod towards the centerline of said machine while continuing to maintain the constant force of oscillation and the constant stroke thereof after a shift of such stroke away from the centerline of the machine and when the force exerted by said first striker rod on the plant falls below said desired reference level.

3. The method of claim 1 wherein the step of shifting the stroke of said first striker rod is carried out with the desired reference level being the amount of force exerted by the second striker rod as it moves inwardly towards the centerline of the machine and strikes the plants.

4. The method of claim 3 and further including shifting the stroke of the second striker rod towards the centerline of the machine as the stroke of the first striker rod is shifted away from such centerline, and by a like amount.

5. The method as set forth in claim 4 and further including:
    oscillating said striker rods such that said first striker rod tip is moved away from the centerline of said machine when said second striker rod tip is moved towards said centerline, and vice versa.

6. The method of claim 1 wherein the step of shifting the stroke of the first stroker rod is carried out with the desired reference level being a predetermined fixed amount of force.

7. The method of claim 6 and further including:
    shifting the stroke of the first striker rod back towards the centerline of the machine while continuing to maintain the constant force of oscillation and the constant stroke thereof after a shift of such stroke away from such centerline and when the force exerted by said first striker rod on the plants falls below said predetermined fixed amount of force.

8. The method of claim 7 and further including:
    shifting the stroke of the second striker rod tip away from the centerline of the machine while continuing to maintain the constant force of oscillation and the constant stroke thereof when the force exerted by the second striker rod on the plants exceeds said predetermined fixed amount of force,
    thereafter shifting the stroke of the second striker rod back towards the centerline of the machine while continuing to maintain the constant force of oscillation and the constant stroke thereof when the force exerted by said second striker rod on said plant falls below said predetermined fixed amount of force.

9. The method of operating the striker rods of a harvesting machine, the machine being adapted to straddle and move along a row of plants and having first and second opposed and elongated striker rods mounted on the machine and on opposite sides of the centerline, the striker rods being pivotal about vertical axes so that the rods and tips thereof can be moved inwardly towards and outwardly from the centerline of the machine, the method comprising:

continuously oscillating each of the striker rods about its vertical axes with a constant force of oscillation and through a constant arcuate stroke inwardly and outwardly from the centerline of the machine as the machine moves along the row of plants, sensing the amount of force exerted by each of the striker rods against the plants as the striker rod tips move inwardly towards the centerline of the machine and strike the plants, simultaneously shifting the stroke of the first striker rod away from the centerline of the machine and shifting the stroke of the second striker rod towards the centerline of the machine when the force exerted by the first striker rod on the plants exceeds the force exerted by the second striker rod on the plants, stopping such shifting of the strokes of the first and second striker rods relative to the centerline of the machine when the forces exerted by the first and second striker rods on the plants are equal.

10. The method of claim 9 and further including:
simultaneously shifting the stroke of the second striker rod away from the centerline of the machine and shifting the stroke of the first striker rod towards the centerline of the machine when the force exerted by the second striker rod on the plants exceeds the force exerted by the first striker rod on the plants, stopping such shifting of the strokes of the second and first striker rods relative to the centerline of the machine when the forces exerted by the first and second striker rods on the plants are equal.

11. The method as set forth in claim 10 and further including:
oscillating said striker rods to move said first striker rod tip away from the centerline of said machine during movement of said second striker rod tip towards said centerline, and vice versa.

12. The method of claim 9 wherein the steps of simultaneously shifting the stroke of one striker rod away from the centerline of the machine and shifting the stroke of the other striker rod towards the centerline are carried out when the forces exerted by said striker rods on the plants are below a predetermined fixed amount of force and further including:
shifting the strokes of said striker rods away from each other when the forces exerted by said striker rods on said plants exceeds said fixed amount of force, to limit the forces exerted by said striker rods on said plants to said fixed amount of force.

13. A method of operating the striker rods of a harvesting machine, the machine being adapted to straddle and move along a row of plants and having first and second opposed and elongated striker rods mounted on the machine and on opposite sides of the centerline thereof, the striker rods being pivotal about vertical axes so that the rods and tips thereof can be moved inwardly towards and outwardly from the centerline of the machine, the method comprising:

continuously oscillating each of the striker rods about its vertical axis with a constant force of oscillation and through a constant arcuate stroke inwardly and outwardly from the centerline of the machine as the machine moves along the row of plants, establishing a minimum distance between the centerline of the machine and the strokes of both of the striker rods, sensing the amount of force exerted by each of the striker rods against the plants as the striker rods move inwardly towards the centerline of the machine and strike the plants, maintaining the minimum distance of the stroke of the first striker rod from the centerline of the machine for as long as the force exerted by said first striker rod on said plants is below a predetermined fixed amount of force, maintaining the minimum distance of the strokes of the second striker rod from the centerline of the machine for as long as the force exerted by said second striker rod on said plants is below said fixed amount of force, shifting the stroke of said first striker rod tip away from the centerline of the machine when the force exerted by said first striker rod on said plants exceeds said predetermined fixed amount of force to limit such force to such fixed amount, shifting the stroke of said second striker rod tip away from the centerline of the machine when the force exerted by said second striker rod on said plants exceeds said predetermined fixed amount of force to limit such force to such fixed amount.

14. The method as set forth in claim 13 and further including:
shifting the stroke of said first striker rod back towards the centerline of the machine after a shift away therefrom and when the force exerted by said first striker rod on said plants falls below said fixed amount of force, shifting the stroke of said second striker rod away from the centerline of the machine after a shift away therefrom and when the force exerted by said second striker rod on said plants falls below said fixed amount of force.

15. The method as set forth in claim 14 and further including:
oscillating said striker rods to move said first striker rod tip away from the centerline of said machine during movement of said second striker rod tip towards said centerline, and vice versa.

16. In a harvesting machine having a wheeled frame adapted to straddle and move along a row of plants,
a subframe suspended from said frame on one side of the centerline of said machine,
a striker rod holder mounted on said subframe for oscillatory movement about a vertical axis,
a elongated striker rod mounted on said holder and having a tip spaced horizontally from said rod holder,
a cyclically operable drive means connected to said rod holder for oscillating said rod holder with a constant force of oscillation and through a predetermined angle to oscillate said striker rod through an arcuate stroke inwardly and outwardly relative to the centerline of the machine during each cycle of operation of said drive means,
mounting means movably mounting said drive means relative to said subframe for shifting the stroke of said striker rod relative to said centerline of said machine upon movement of said mounting means and said drive means relative to said subframe, control means responsive to the amount of force exerted by said striker rod on an object in its path of arcuate movement towards said centerline of said machine for moving said mounting means and said drive means relative to said subframe to shift the stroke of said striker rod relative to the centerline of said machine, said cyclically operable drive means having the further function of oscillating said rod holder with a constant force of oscillation regardless of the position of said striker rod stroke relative to the centerline of said machine.

17. In a machine as claimed in claim 16 wherein said control means includes means for moving said mounting means and said drive means to shift the stroke of said striker rod away from said centerline of said machine when the force of said striker rod on said object exceeds a predetermined fixed amount of force.

18. In a machine as claimed in claim 17 and wherein said control means further includes means for adjusting the predetermined fixed amount of force.

19. In a machine as claimed in claim 16 wherein said control means includes an extensible and retractable hydraulic cylinder interconnected between said subframe and said mounting means, means for filling said cylinder with hydraulic fluid, and means including an adjustable relief valve for exhausting fluid from said cylinder when the pressure therein exceeds the setting of said relief valve.

20. In a machine as claimed in claim 16 wherein said drive means includes a crank means having a crank shaft with its axis parallel to said centerline of said machine, said crank means having a first crank arm extending outwardly from said shaft and connectable to a reciprocating member for oscillation of said crank shaft about its axis, said crank means having a second crank arm extending outwardly from said shaft, and a drive link connecting said second crank arm and said striker rod for oscillation of said striker rod holder in response to oscillation of said crank shaft, and wherein said mounting means includes means supporting said crank shaft from said subframe for translatory movement of said crank shaft towards and away from the centerline of the machine.

21. In a machine as set forth in claim 16 wherein said mounting means comprises a second crank means having a second crank shaft journalled to said subframe for rotative movement about a fixed axis parallel to the centerline of said machine, said second crank shaft having first and second crank arms parallel to each other and extending outwardly from the axis thereof, said crank shaft of said drive means being rotatably journalled in said first and second crank arms of said second crank means.

22. In a machine as set forth in claim 21, wherein said second crank means has a third crank arm extending outwardly from said second crank shaft, and wherein said control means includes an extensible and contractable hydraulic cylinder interconnected between said subframe and said third crank arm of said second crank means.

23. In a machine as set forth in claim 20, said crank means further including a third crank arm extending outwardly from said crank shaft, said machine further including a second striker rod holder mounted on said subframe for oscillatory movement about a vertical axis, an elongated striker rod mounted on said second striker rod holder and having a tip spaced horizontally from said second striker rod holder, and a connecting link means connecting said second striker rod holder and said third crank arm for oscillation of said second striker rod holder about its vertical axis in response to oscillation of said crank means about the axis of its shaft.

24. In a machine as set forth in claim 20, said crank means further including third and fourth crank arms extending outwardly from said crank shaft, said third crank arm being parallel to said second crank arm and said fourth crank arm being 180° offset from said second and third crank arms, said machine further including a second striker rod holder mounted on said subframe for oscillatory movement about a vertical axis, an elongated striker rod mounted on said second striker rod holder and having a tip spaced horizontally from said second striker rod holder, and a connecting link means for selectively connecting said second striker rod holder to one of said third or fourth crank arms for oscillation of said second striker rod holder about its vertical axis in response to oscillation of said crank means about the axis of its shaft.

25. In a harvesting machine having a frame adapted to straddle and move along a row of plants,
a first subframe suspended from said frame on one side of the centerline of said machine,
a first striker rod holder mounted on said first subframe for oscillatory movement about a vertical axis,
a first elongated striker rod mounted on said first rod holder and having a tip spaced horizontally from said first rod holder,
a first cyclically operable drive means connected to said first rod holder for oscillating said first rod holder through a predetermined angle to oscillate said first striker rod through an arcuate stroke inwardly and outwardly relative to the centerline of the machine during each cycle of operation of said drive means,
means movably mounting said drive means relative to said first subframe for shifting the stroke of said first striker rod relative to the centerline of said machine upon movement of said first mounting means and said first drive means relative to said first subframe,
said first cyclically operable drive means further having the function of oscillating said first rod holder with a constant force of oscillation regardless of the position of the stroke of said first striker rod relative to the centerline of said machine,
a second subframe suspended from said frame on the other side of the centerline of said machine,
a second striker rod holder mounted on said second subframe for oscillatory movement about a vertical axis,
a second elongated striker rod mounted on said second rod holder and having a tip spaced horizontally from said second rod holder,
a second cyclically operable drive means connected to said second rod holder for oscillating said second rod holder through a predetermined angle to oscillate said second striker rod through an arcuate stroke inwardly and outwardly relative to the centerline of the machine during each cycle of operation of said second drive means,
second means movably mounting said second drive means relative to said second subframe for shifting the stroke of said second striker rod relative to the centerline of said machine upon movement of said second mounting means and said second drive means relative to said second subframe, said second cyclically operably drive means further having the function of oscillating said second rod holder with a constant force of oscillation regardless of the stroke of said second striker rod relative to the centerline of said machine, control means responsive to the forces exerted by said first and secnd striker rods on an object therebetween and in their paths of arcuate movement for moving said first mounting means and said first drive means to shift the stroke of said first striker rod away from the centerline of said machine when said force exerted by said first striker rod is greater than a desired reference level.

26. In a harvesting machine as claimed in claim 25, wherein said control means includes means for moving said first mounting means and said first drive means to shift the stroke of said first striker rod away from the centerline of said machine when the level of force of said first striker rod on said object is greater than the level of force of said second striker rod on said object, and wherein said control means includes means for moving said second mounting means and said second drive means to shift the stroke of said second striker rod towards the centerline of said machine by an amount equal to the shift of the stroke of said first striker rod away from said centerline when the level of force of said first striker rod on said object is greater than the level of force of said second striker rod on said object.

27. In a machine as claimed in claim 26 and further including means for operating said first and second cyclically operable drive means to move said first striker rod during a stroke thereof towards the centerline of said machine when said second striker rod is moving away therefrom, and vice versa.

28. In a machine as claimed in claim 26 wherein said control means includes first and second extensible and retractable hydraulic cylinders, said first hydraulic cylinder being interconnected between said first subframe and said first mounting means, said second hydraulic cylinder being interconnected between said second subframe and said second mounting means, and means fluidly interconnecting said hydraulic cylinders for extending one of said cylinders in response to retraction of the other of said cylinders and vice versa.

29. In a machine as claimed in claim 28, wherein said control means further includes operator-controllable means for selectively extending or retracting both of said cylinders simultaneously.

30. In a machine as claimed in claim 25, wherein said control means includes means for moving said first mounting means and said first drive means to shift the stroke of said first striker rod away from the centerline of said machine when the magnitude of force of said first striker rod on said object is greater than a predetermined fixed amount of force, and wherein said control means further includes means for moving said second mounting means and said second drive means to shift the stroke of said second striker rod away from said centerline when the magnitude of force of said second striker rod on said object is greater than said predetermined fixed amount of force.

31. In a machine as claimed in claim 30 and further including means for operating said first and second cyclically operable drive means to move said first striker rod during a stroke thereof towards the centerline of said machine when said second striker rod is moving away therefrom, and vice versa.

32. In a machine as claimed in claim 30 wherein said control means includes first and second extensible and retractable hydraulic cylinders, said first hydraulic cylinder being interconnected between said first subframe and said first mounting means, said second hydraulic cylinder being interconnected between said second subframe and said second mounting means, means for supplying hydraulic fluid under pressure to both of said cylinders, and means including a relief valve for releasing fluid from either of said hydraulic cylinders when the hydraulic pressure therein is above the setting at which said relief valve will open.

33. In a machine as claimed in claim 30 wherein said control means includes means for restricting the flow of hydraulic fluid under pressure to said cylinder to a rate less than the rate at which hydraulic fluid is released from said cylinder through said relief valve.

34. In a machine as claimed in claim 30 wherein said control means further includes means for adjusting the pressure setting at which said relief valve will open.

35. In a harvesting machine having a wheeled frame adapted to straddle and move along a row of plants,
a subframe suspended from said frame on one side of the centerline of said machine,
first and second striker rod holders mounted on said subframe for oscillatory movement of said striker rod holders about spaced apart vertical axes,
at least one elongated striker rod mounted on each of said striker rod holders, each striker rod having a tip spaced horizontally from the rod holder on which it is mounted,
drive crank means having a crank shaft mounted on said subframe with the axis of said crank shaft parallel to the centerline of said machine, said drive crank means including first, second and third crank arms extending outwardly from said crank shaft,
reciprocating means connected to said first crank arm for oscillating said crank shaft through a predetermining angle,
a first connecting means connecting said first striker rod holder and said second crank arm for oscillating said first striker rod holder in response to oscillation of said crank shaft,
a second connecting means connecting said second striker rod holder and said third crank arm for oscillating said second striker rod holder in response to oscillation of said crank shaft.

36. In a machine as set forth in claim 35 wherein said second and third crank arms are parallel to each other, said drive crank means having a fourth crank arm extending outwardly from said crank shaft, said fourth crank arm being 180° offset from said second and third crank arms, and wherein said second connecting means is selectively connectable from said second striker rod holder to one of said third or fourth crank arms.

* * * * *